UNITED STATES PATENT OFFICE.

ROBERT LAYBURN AND PATRICK JOSEPH REILLY, OF BROOKLYN, NEW YORK.

FIRE AND WATER PROOF COMPOSITION OF MATTER TO BE USED FOR BUILDING PURPOSES.

No. 795,399.     Specification of Letters Patent.     Patented July 25, 1905.

Application filed January 12, 1905. Serial No. 240,831.

*To all whom it may concern:*

Be it known that we, ROBERT LAYBURN and PATRICK JOSEPH REILLY, citizens of the United States, residing at Brooklyn, in the county of Kings and State of New York, have invented certain new and useful Improvements in Fire and Water Proof Composition of Matter to be Used for Building Purposes; and we do declare the following to be a full, clear, and exact description of the invention, such as will enable others skilled in the art to which it appertains to make and use the same.

Our composition consists of the following ingredients combined in the proportions stated, viz: water, fifteen per cent.; dextrine, two per cent; glycerin, two per cent.; magnesia, twenty-five per cent.; magnesium chlorid, ten per cent., and forty-six per cent. of some basic body or compound consisting of one or more of the following substances: sand, wood-dust, marble-dust, powdered ashes or cinders, powdered granite, and gypsum. These ingredients are to be thoroughly mingled by agitation and when so mixed form an excellent fire and water proof composition for general building purposes. In mixing these elements the water, dextrine, glycerin, magnesia, and magnesium chlorid are combined to form a composition which serves as a binder, and the basic body or compound is then added, the latter forming the body of the composition and is held together by the binder.

In order to obtain a very efficient fireproof composition, I may combine the following substances: water, fifteen per cent.; glycerin, two per cent.; dextrine, two per cent.; magnesia, twenty-five per cent.; magnesium chlorid, ten per cent.; sand, twenty per cent.; sawdust, twenty-six per cent.

It will be seen that in the above the sand and sawdust form the body of the composition and are held together by the binder, which consists of water, magnesia, magnesium chlorid, glycerin, and dextrine. For the composition which is particularly adapted for use for making subbasins, molding, &c., we may substitute powdered ashes for the wood-dust and sand in the above formula—that is, we may use forty-six per cent. of the powdered ashes or cinders in place of twenty per cent. of sand and twenty-six per cent of sawdust.

A very efficient waterproof composition for use in making foundations, cellars, sidewalks, and the like may be made from the following substances: water, fifteen per cent.; glycerin, two per cent.; dextrine, two per cent.; magnesia, twenty-five per cent.; magnesium chlorid, ten per cent.; sand, forty-six per cent.

In the above it will be seen forty-six per cent. of sand is substituted for the same per cent. of powdered ashes in the foregoing formula.

By substituting powdered granite for the sand in the above the composition produced will be very efficient for making bricks and artificial stone, and by similarly substituting marble-dust for the same the resulting composition will be well adapted for making tiles, plastic casts, and the like.

It will be seen that in each of the above-named formulæ we employ dextrine, glycerin, magnesia, and magnesium chlorid, together with one or more of the following diluents or bodies: wood-dust, sand, marble-dust, powdered ashes, powdered granite, plaster, and add sufficient water to bring the composition to its proper test for strength.

What we claim, and desire to secure by Letters Patent, is—

1. The herein-described composition of matter, consisting of water, magnesia, magnesium chlorid, glycerin, dextrine, and a basic body or compound.

2. The herein-described composition of matter consisting of a binding composed of water, magnesia, magnesium chlorid, glycerin and dextrine, and a basic body or compound composed of one or more of the following substances, sand, wood-dust, marble-dust, powdered granite, powdered ashes, gypsum.

3. The herein-described composition of matter consisting of fifteen per cent. of water, twenty-five per cent. of magnesia, ten per cent. of magnesium chlorid, two per cent. of glycerin, two per cent. of dextrine and forty-six per cent. of a suitable body or compound.

4. The herein-described composition of matter consisting of water, magnesia, magnesium chlorid, glycerin, dextrine and sand, substantially as described and for the purpose herein specified.

In testimony whereof we have hereunto set our hands in presence of two subscribing witnesses.

ROBERT LAYBURN.
PATRICK JOSEPH REILLY

Witnesses:
 MICHAEL SMITH,
 JAMES LAYBURN.